(12) United States Patent
Lynch et al.

(10) Patent No.: US 7,453,883 B1
(45) Date of Patent: Nov. 18, 2008

(54) METHOD FOR COMPRESSING ROUTE DATA IN A ROUTER

(75) Inventors: William L. Lynch, La Honda, CA (US); Srihari Ramachandra Sangli, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 895 days.

(21) Appl. No.: 10/414,137

(22) Filed: Apr. 14, 2003

(51) Int. Cl.
H04L 12/28 (2006.01)

(52) U.S. Cl. .................. 370/395.32; 370/389; 370/392; 370/395.31

(58) Field of Classification Search .................. 370/392, 370/393, 395.3, 395.31, 395.32, 395.54, 370/408, 429, 464, 465, 389; 709/238–244; 711/216, 221
See application file for complete search history.

(56) References Cited

U.S. PATENT DOCUMENTS

| | | | |
|---|---|---|---|
| 5,734,649 A | 3/1998 | Carvey et al. | |
| 5,781,772 A | 7/1998 | Wilkinson, III et al. | |
| 5,787,430 A * | 7/1998 | Doeringer et al. ........... 707/100 |
| 5,905,725 A | 5/1999 | Sindhu et al. | |
| 5,909,440 A * | 6/1999 | Ferguson et al. ............ 370/389 |
| 5,920,699 A | 7/1999 | Bare | |
| 6,011,795 A | 1/2000 | Varghese et al. | |
| 6,018,524 A * | 1/2000 | Turner et al. ................ 370/392 |
| 6,212,184 B1* | 4/2001 | Venkatachary et al. ...... 370/392 |
| 6,308,219 B1 | 10/2001 | Hughes | |
| 6,526,055 B1 | 2/2003 | Perlman et al. | |
| 6,614,789 B1* | 9/2003 | Yazdani et al. ............... 370/392 |
| 6,721,316 B1 | 4/2004 | Epps et al. | |
| 6,731,633 B1 | 5/2004 | Sohor et al. | |
| 6,778,490 B1 | 8/2004 | Achilles et al. | |
| 6,801,950 B1 | 10/2004 | O'Keeffe et al. | |
| 6,859,455 B1* | 2/2005 | Yazdani et al. ............... 370/392 |
| 6,965,615 B1 | 11/2005 | Kerr et al. | |
| 7,031,320 B2* | 4/2006 | Choe ...................... 370/395.31 |
| 7,069,372 B1 | 6/2006 | Leung, Jr. et al. | |
| 7,111,071 B1 | 9/2006 | Hooper | |
| 7,230,912 B1* | 6/2007 | Ghosh et al. ................. 370/216 |
| 7,308,495 B2* | 12/2007 | Ishiyama et al. ............ 709/223 |
| 7,315,900 B1* | 1/2008 | Ofelt et al. .................. 709/238 |

OTHER PUBLICATIONS

"Xelerated Packet Devices", *MicroDesign Resources Presentation, Network Processor Forum*, (Jun. 14, 2001),11 pgs.

(Continued)

*Primary Examiner*—Wing F. Chan
*Assistant Examiner*—Mark A. Mais
(74) *Attorney, Agent, or Firm*—Schwegman, Lundberg & Woessner, P.A.

(57) ABSTRACT

A method for a router having a routing table and a forwarding table. In an embodiment, the method includes creating an entry for use in the forwarding table, the entry corresponding to multiple entries of the routing table. The entry may correspond to a set of entries of the routing table which specify overlapping IP addresses and a same next hop router, in one example. In another example, the entry may be an aggregate entry corresponding to a set of entries of the routing table which specify the same next hop router.

14 Claims, 10 Drawing Sheets

EXAMPLE

ROUTING TABLE ENTRIES

84 ~ 1.1.0.0/16 → ($I_1$, B) ⎫
86 ~ 1.1.1.0/24 → ($I_1$, B) ⎬ REPRESENT IN FORWARDING TABLE AS:
                                    ⎭ 1.1.0.0/16 → ($I_1$, B) ~ 88

90 ~ 1.1.1.1/32 → ($I_3$, D) } 1.1.1.1/32 → ($I_3$, D) ~ 92

IF ENTRY 86 OF ROUTING TABLE CHANGES:

94 ~ 1.1.1.0/24 CHANGES TO ($I_3$, D) } ADD TO FORWARDING TABLE

96 ~ 1.1.1.0/24 → ($I_3$, D)

AND DELETE

92 ~ [1.1.1.1/32 → ($I_3$, D)]

OTHER PUBLICATIONS

Belenkiy, A., "Deterministic IP Table Lookup at Wire Speed", *The Internet Global Summit (INET '99)*, http://www.isoc.org/inet99/proceedings/4j/4j_2.htm,(observed May 12, 2003),18 pgs.

Chiueh, T.-C., et al., "High-Performance IP Routing Table Lookup Using CPU Caching", *Proceedings, Eighteenth Annual Joint Conference of the IEEE Computer and Communication Societies (INFOCOM '99)*, vol. 3, (1999), 1421-1428.

Degermark, M., et al., "Small Forwarding Tables for Fast Routing Lookups", *Proceedings, ACM SIGCOMM '97*, (1997),3-14.

Gupta, P., et al., "Classifying Packets With Hierarchical Intelligent Cuttings", *IEEE Micro*, 21(1), (Jan./Feb. 2000),34-41.

Gupta, P., et al., "Packet Classification on Multiple Fields", *Proceedings of the Conference on Applications, Technologies, Architectures, and Protocols for Computer Communication (ACM SIGCOMM '99)*, (1999),147-160.

Gupta, P., et al., "Routing Lookups in Hardware at Memory Access Speeds", *Proceedings, Seventeen Annual Joint Conference of the IEEE Computer and Communications Societies (INFOCOM '98)*, vol. 3, (1998),1240-1247.

Lakshman, T. V., et al., "High-Speed Policy-Based Packet Forwarding Using Efficient Multi-Dimensional Range Matching", *Proceedings of the Conference on Applications, Technologies, Architectures, and Protocols for Computer Communications (ACM SIGCOMM '98)*, (1998),203-214.

Lampson, B., et al., "IP Lookups Using Multiway and Multicolumn Search", *IEEE/ACM Transactions on Networking*, 7(3), (Jun. 1999),324-334.

Lindberg, K., "Multi-Gigabit Routers", *Proceedings, HUT Internetworking Seminar*, http://www.tml.hut.fi/Opinnot/Tik-110.551/1998/papers/02MultiGigabitRouter/paper.html,(observed May 12, 1998),14 pgs.

McAuley, A. J., et al., "Fast Routing Table Lookup Using CAMs", *Proceedings, Twelfth Annual Joint Conference of the IEEE Computer and Communications Societies, Networking: Foundation for the Future (INFOCOM '93)*, vol. 3, (1993), 1382-1391.

Partridge, C., et al., "A 50-Gb/s IP Router", *IEEE/ACM Transactions on Networking*, 6(3), (Jun. 1998),237-248.

Qui, L., et al., "Fast Firewall Implementations for Software and Hardware-Based Routers", *Microsoft Technical Report MSR-TR-2001-61*, (Jun. 2001),18 pgs.

Srinivasan, V., et al., "Fast and Scalable Layer Four Switching", *Proceedings of the Conference on Applications, Technologies, Architectures, and Protocols for Computer Communications (ACM SIGCOMM '98)*, (1998),191-202.

Srinivasan, V., et al., "Packet Classification Using Tuple Space Search", *Proceedings of the Conference on Applications, Technologies, Architectures, and Protocols (ACM SIGCOMM '99)*, (1999), 135-146.

Waldvogel, M., et al., "Scalable High Speed IP Routing Lookups", *Proceeding, ACM SIGCOMM '97*, (1997),25-36.

* cited by examiner

EXAMPLE OF ROUTING TABLE FOR ROUTER A

| PREFIX | (INTERFACE, ROUTER) | NEXT HOP INFORMATION |
|---|---|---|
| 1.1.0.0/16 | ($I_1$, B) | |
| 4.4.4.4/32 | ($I_3$, B) | |
| ⋮ | ⋮ | |

EXAMPLE

ROUTING TABLE ENTRIES

84 ~ 1.1.0.0/16 ⟶ ($I_1$, B)
86 ~ 1.1.1.0/24 ⟶ ($I_1$, B)

REPRESENT IN FORWARDING TABLE AS:
88 ~ 1.1.0.0/16 ⟶ ($I_1$, B)

EXAMPLE

ROUTING TABLE ENTRIES

84 ~ 1.1.0.0/16 → ($I_1$, B)   REPRESENT IN FORWARDING TABLE AS:
86 ~ 1.1.1.0/24 → ($I_1$, B)   } 1.1.0.0/16 → ($I_1$, B) ~ 88
90 ~ 1.1.1.1/32 → ($I_3$, D)   } 1.1.1.1/32 → ($I_3$, D) ~ 92

IF ENTRY 86 OF ROUTING TABLE CHANGES:

94 ~ 1.1.1.0/24 CHANGES TO ($I_3$, D) } ADD TO FORWARDING TABLE

96 ~ 1.1.1.0/24 → ($I_3$, D)

AND DELETE

110 ~ 2.2.0.0/24 → ($I_3$, D)   REPRESENT IN FORWARDING TABLE AS:
112 ~ 2.2.1.0/24 → ($I_3$, D)   } 2.2.0.0/23 → ($I_3$, D) ~ 114

BECAUSE              RELEVANT 2.2.0.0/24 → 0000 0010.0000 0010. 0000 0000.0000 0000

2.2.1.0/24 → 0000 0010.0000 0010. 0000 0001.0000 0000

REPEAT AS:

114 ~ 2.2.0.0/23

IN FORWARDING TABLE

*FIG. 12*

EXAMPLE

ROUTING TABLE ENTRIES

110 ~ 2.2.0.0/24 → ($I_3$, D)  
112 ~ 2.2.1.0/24 → ($I_3$, D)  
} REPRESENT IN FORWARDING TABLE AS:  
2.2.0.0/23 → ($I_3$, D) ~ 114

IF ENTRY 112 CHANGES IN ROUTING TABLE TO:

120 ~ 2.2.1.0/24 → ($I_3$, D) } DELETE FORWARDING TABLE OF

114 ~ [2.2.0.0/23 → ($I_3$, D)]

AND ADD

EXAMPLE

ROUTING TABLE ENTRIES

110 ~ 2.2.0.0/24 → ($I_3$, D)  
112 ~ 2.2.1.0/24 → ($I_3$, D)  
} REPRESENT IN FORWARDING TABLE AS:  
2.2.0.0/23 → ($I_3$, D) ~ 114

IF ENTRY 130 IS ADDED TO ROUTING TABLE:

130 ~ 2.2.2.0/23 → ($I_3$, D) } THEN DELETE

114 ~ [2.2.0.0/23 → ($I_3$, D)]

AND ADD

EXAMPLE

ROUTING TABLE ENTRIES

140 ~ 2.2.3.0/24 ⟶ ($I_3$, D)
142 ~ 2.2.2.0/24 ⟶ ($I_3$, D)
144 ~ 2.2.0.0/24 ⟶ ($I_3$, D)
146 ~ 2.2.1.0/24 ⟶ ($I_3$, D)

REPRESENT AS AN ENTRY IN THE FORWARDING TABLE:
2.2.0.0/22 ⟶ ($I_3$, D) ~ 148

*FIG. 15*

EXAMPLE

ROUTING TABLE ENTRIES

140 ~ 2.2.3.0/24 ⟶ ($I_3$, D)
142 ~ 2.2.2.0/24 ⟶ ($I_3$, D)
144 ~ 2.2.0.0/24 ⟶ ($I_3$, D)
146 ~ 2.2.1.0/24 ⟶ ($I_3$, D)

REPRESENT AS AN ENTRY IN THE FORWARDING TABLE:
2.2.0.0/22 ⟶ ($I_3$, D) ~ 148

IF ENTRY 142 IS DELETED:
130 ~ [2.2.2.0/24 ⟶ ($I_3$, D)]

THEN DELETE
148 ~ 2.2.0.0/22 ⟶ ($I_3$, D)
ADD
150 ~ 2.2.0.0/23 ⟶ ($I_3$, D)
ADD
152 ~ 2.2.3.0/24 ⟶ ($I_3$, D)

*FIG. 16*

EXAMPLE

ROUTING TABLE ENTRIES

140 ~ 2.2.3.0/24 → $(I_3, D)$
142 ~ 2.2.2.0/24 → $(I_3, D)$
144 ~ 2.2.0.0/24 → $(I_3, D)$
146 ~ 2.2.1.0/24 → $(I_3, D)$

REPRESENT AS AN ENTRY IN THE FORWARDING TABLE:
2.2.0.0/22 → $(I_3, D)$ ~ 148

IF ENTRY 142 CHANGES TO:
142 ~ 2.2.2.0/24 → $(I_4, C)$

POPULATE FORWARDING TABLE WITH AN EXCEPTION NODE ENTRY
2.2.2.0/24 → $(I_4, C)$ ~ 164

*FIG. 17*

EXAMPLE

ROUTING TABLE ENTRIES

140 ~ 2.2.3.0/24 → $(I_3, D)$
142 ~ 2.2.2.0/24 → $(I_3, D)$
144 ~ 2.2.0.0/24 → $(I_3, D)$
146 ~ 2.2.1.0/24 → $(I_3, D)$

REPRESENT AS AN ENTRY IN THE FORWARDING TABLE:
2.2.0.0/22 → $(I_3, D)$ ~ 148

IF ENTRY 143 CHANGES TO:
143 ~ 2.2.2.0/24 → $(I_4, C)$

POPULATE FORWARDING TABLE WITH:
2.2.2.0/24 → $(I_4, C)$ ~ 164

AND

IF ENTRY 143 OF
2.2.2.0/24 VIA $(I_4, C)$
IS DELETED FROM ROUTING TABLE,
THEN CHANGE FORWARDING TABLE
ENTRY 164 TO CREATE A HOLE 2.2.2.0/24 → DISCARD ~ 174

*FIG. 18*

EXAMPLE
(FROM PRIOR EXAMPLE OF FIG. 18)

ROUTING TABLE                    FORWARDING TABLE

140 ~ 2.2.3.0/24 → ($I_3$, D)    148 ~ 2.2.0.0/22 → ($I_3$, D)

144 ~ 2.2.0.0/24 → ($I_3$, D)    174 ~ 2.2.2.0/24 → DISCARD

146 ~ 2.2.1.0/24 → ($I_3$, D)

IF ENTRY 180 IS ADDED TO ROUTING TABLE:    KEEP THE AGGREGATE 148 AND REVISE THE HOLE 174 ENTRY TO BE:

METHOD FOR COMPRESSING ROUTE DATA IN A ROUTER

TECHNICAL FIELD

This application relates, in general, to routers, and more particularly to methods for compressing route data used in, for example, a forwarding table of a router.

BACKGROUND

As shown in FIG. 1, routers such as router 20 have a route processor 22 and a forwarding engine 24. The route processor 22 communicates with other routers 26, 28, 30 in a network to obtain updates of route information regarding the network. A route processor 22 maintains a routing table 32 which contains a large number of entries for use by the router 20 to determine how to forward packets that are received by the router. Conventional routing tables 32 may contain hundreds of thousands of elements, and as a greater number of devices such as personal data assistants (PDAs), cell phones, and other devices are assigned IP addresses, the number of entries in a routing table 32 is expected to grow substantially over the coming years.

The forwarding engine 24 of a router 20 has a forwarding table 34 containing routing information obtained from the route processor 22. The forwarding engine 24 accesses its forwarding table 34 during a lookup process performed by the forwarding engine 24 to determine the next hop or next destination of a packet being processed by the router 20.

When the route/processor 22 receives a new route from another router 26, 28, or 30 in the network and updates its routing table 32 information to reflect the new route data, the route processor 22 passes the new route information to the forwarding engine 24 so that the appropriate changes may be made in the forwarding table 34. In conventional routers, the entire routing table 32 may be copied into the forwarding table 34 of the forwarding engine.

As recognized by the present inventors, what is needed is a method for reducing the number of entries in a forwarding table while maintaining the proper forwarding information to make correct forwarding decisions.

It is against this background that various embodiments of the present invention were developed.

SUMMARY OF THE INVENTION

In light of the above and according to one broad aspect of one embodiment of the present invention, disclosed herein is a method for reducing the number of entries in a forwarding table by creating forwarding table entries that are representative of multiple entries of a routing table. In this manner, the total number of entries in the forwarding table will be substantially less than the number of entries in the routing table and yet still represent accurate routing information to be used by a forwarding engine in making a forwarding decision.

According to another broad aspect of another embodiment of the invention, disclosed herein is a method for representing two or more entries of a routing table of a router using a reduced number of entries in a forwarding table. In this embodiment, the entries of the routing table specify at least IP address information (such as an IP address or range of IP addresses) and a next hop router. The method includes determining if the two or more entries of the routing table can be represented in the forwarding table using a number of entries less than the two or more entries of the routing table, and if so, representing in the forwarding table the two or more entries of the routing table using a number of entries less than the two or more entries of the routing table.

In one embodiment, the determining operation includes identifying a set of entries of the routing table which specify overlapping IP addresses and the same next hop router. Or the determining operation may include identifying a set of entries of the routing table which specify the same next hop router and for which an aggregate entry may represent the set of entries. In one example, the representing operation includes representing the set of entries of the routing table with the aggregate entry for the forwarding table. Further, if one entry of the set of entries undergoes a change in its next hop router, an exception node entry may be created in the forwarding table to represent the one entry. Or, if one entry of the set of entries has its next hop router deleted, a discard entry may be created in the forwarding table to represent the one entry.

According to another broad aspect of another embodiment of the invention, disclosed herein is a method in a router for representing in a forwarding table two or more entries of a routing table. The method includes determining if the two or more entries of the routing table can be represented in the forwarding table using a reduced number of entries, and if so, representing in the forwarding table the two or more entries of the routing table using the reduced number of entries. The determining operation may include identifying a set of entries of the routing table which specify overlapping IP addresses and the same next hop router, or may include identifying a set of entries of the routing table which specify the same next hop router and for which an aggregate entry may represent the set of entries.

According to another broad aspect of another embodiment of the invention, disclosed herein is a method for a router having a routing table and a forwarding table. In this embodiment, the method includes creating an entry for use in the forwarding table, the entry corresponding to multiple entries of the routing table. The entry may correspond to a set of entries of the routing table which specify overlapping IP addresses and a same next hop router, or the entry may be an aggregate entry corresponding to a set of entries of the routing table which specify the same next hop router. In another embodiment, the method may also include storing the entry in the forwarding table.

According to another broad aspect of another embodiment of the invention, disclosed herein is a router having a routing table and a forwarding table. The router includes a module for creating an entry for use in the forwarding table, the entry corresponding to multiple entries of the routing table. In one embodiment, the entry may correspond to a set of entries of the routing table which specify overlapping IP addresses and a same next hop router, or the entry may be an aggregate entry corresponding to a set of entries of the routing table which specify the same next hop router. Alternatively, the router may include a module for determining if the two or more entries of the routing table can be represented in the forwarding table using a reduced number of entries, and if so, representing in the forwarding table the two or more entries of the routing table using the reduced number of entries.

Various embodiments of the present invention may be embodied as computer program products including computer usable medium and computer readable code embodied on the computer usable medium, the computer readable code including computer readable program code devices configured to cause the computer to perform or effect one or more of the operations described herein.

The features, utilities and advantages of various embodiments of the invention will be apparent from the following

DESCRIPTION OF THE DRAWINGS

FIG. 11 illustrates an example of representing entries of a routing table with an entry for use in a forwarding table, in accordance with one embodiment of the present invention.

FIG. 12 illustrates an example of representing entries of a routing table with an entry for use in a forwarding table, in accordance with one embodiment of the present invention.

FIG. 13 illustrates an example of representing entries of a routing table with an entry for use in a forwarding table, in accordance with one embodiment of the present invention.

FIG. 14 illustrates an example of representing entries of a routing table with an entry for use in a forwarding table, in accordance with one embodiment of the present invention.

FIG. 15 illustrates an example of representing entries of a routing table with an entry for use in a forwarding table, in accordance with one embodiment of the present invention.

FIG. 16 illustrates an example of representing entries of a routing table with an entry for use in a forwarding table, in accordance with one embodiment of the present invention.

FIG. 17 illustrates an example of representing entries of a routing table with an entry for use in a forwarding table, in accordance with one embodiment of the present invention.

FIG. 18 illustrates an example of representing entries of a routing table with an entry for use in a forwarding table, in accordance with one embodiment of the present invention.

FIG. 19 illustrates an example of representing entries of a routing table with an entry for use in a forwarding table, in accordance with one embodiment of the present invention.

DETAILED DESCRIPTION

Figure 1:
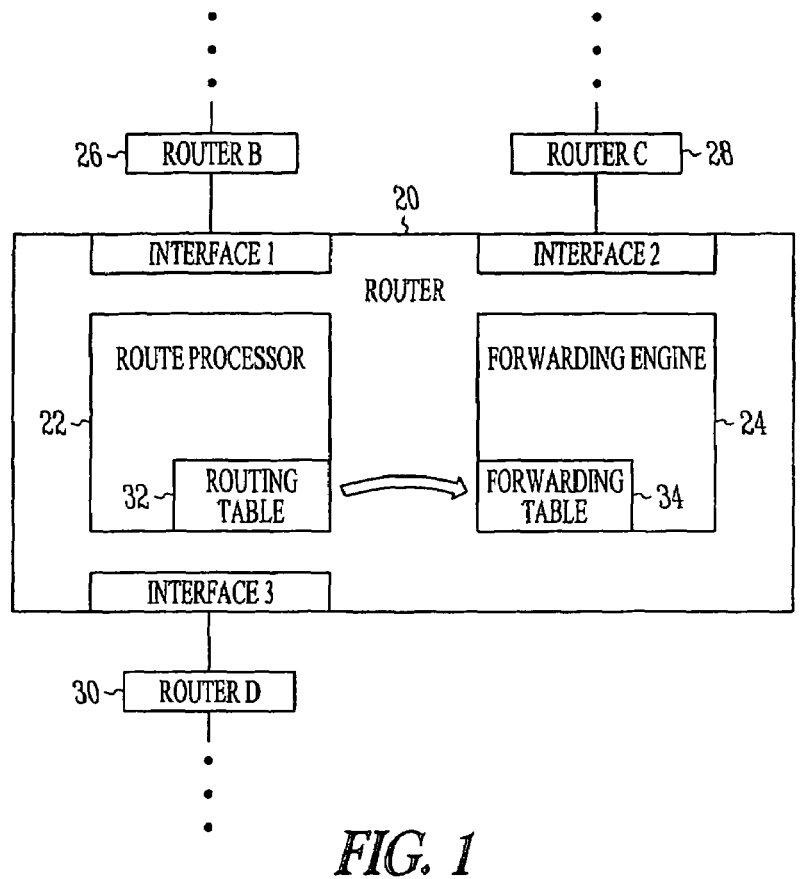
FIG. 1 illustrates a block diagram of network of routers, wherein a router has a routing table and a forwarding table.

According to one broad aspect of one embodiment of the present invention, various methods are disclosed herein for reducing the number of entries of a forwarding table. The methods may be used in networking devices such as routers 20 having a routing table 32 storing route data and a forwarding table 34 for use by a forwarding engine 24 to make a forwarding decision, such as in the example of FIG. 1. It is understood that FIG. 1 is provided by way of example, and one or more aspects of the present invention could be implemented in various different types or models of routers or devices or networks.

In one embodiment, entries of a routing table 32 are represented by using in a forwarding table 34 a number of entries that is less than the number of entries of the routing table 32. In this manner, the resulting entries in the forwarding table 34 will require substantially less memory than the routing table 32 and yet still represent accurate routing information to be used by a forwarding engine 24 in making a routing decision.

Figure 2:
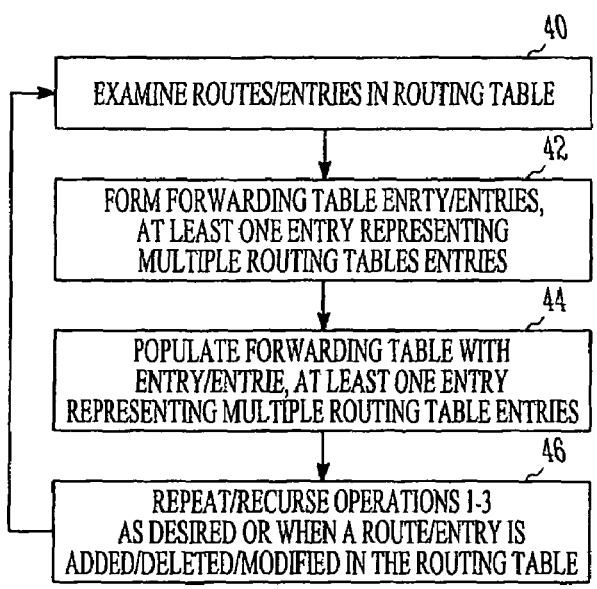
FIG. 2 illustrates an example of logical operations for reducing the number of entries of a forwarding table, in accordance with one embodiment of the present invention.

FIG. 2 illustrates an example of logical operations for reducing the number of entries of a forwarding table, in accordance with one embodiment of the present invention. At operation 40, the routes in the routing table are examined to determine whether two or more of the entries of the routing table may be represented by a single entry in the forwarding table, or whether at least one entry can be formed for the forwarding table which represents multiple routing table entries.

At operation 42, one or more entries of the forwarding table are formed, wherein at least one entry of the forwarding table represents multiple entries of the routing table. In other words, at least one of the entries adapted for use in the forwarding table represents multiple entries of the routing table. Stated differently, operation 42 may form one or more compressed entries for use in a forwarding table, wherein the one or more compressed entries represents multiple routing table entries. Two or more entries of a routing table may be compressed into a more compact representation in a forwarding table, such that two or more entries in a routing table may be represented by an entry in a forwarding table which utilizes a smaller amount of memory space than the two or more routing table entries which it represents.

In forming the entries of the forwarding table at operation 42, these entries are formed such that the routing decision performed by the forwarding engine utilizing the entries of the forwarding table will be unaffected by the reduced number of entries in the forwarding table—in other words, the routing decision will be the same as if the full number of entries of the routing table were used to make the decision.

At operation 44, the forwarding table is populated with one or more entries, and at least one of these entries for the forwarding table represents multiple entries of the routing table. In this manner, operation 42-44 provide for the forwarding table a number of entries that are less than the number of entries of the routing table, thereby reducing the amount of memory required by the routing table to store the entries.

At operation 46 of FIG. 2, operations 40-44 may be repeated, recursively in one example, as desired or when an entry of the routing table is added, deleted, or modified—which may provide a further opportunity to reduce the number of entries in the forwarding table or may require that the entries in the forwarding table be adjusted to account for the change in the routing table. For instance, during an initial phase, the routing table may contain hundred of thousands of entries, and operations 40-44 can be repeated numerous times in order to reduce the number of entries ultimately loaded into the forwarding table. At a steady state (i.e., when the forwarding table is loaded with a reduced number of entries representing all of the routing table entries), as new routes are received by the route processor, operations 40-44 can be utilized to determine whether a new route presents any opportunities to further reduce the number of entries in the forwarding table, in one example.

Entries in the routing table and forwarding table may be organized as nodes of a trie structure so as to facilitate longest prefix match operations or processes by the forwarding engine. When the forwarding engine of a router receives a packet for forwarding, it may perform a longest prefix match by comparing the destination address of the packet to entries of the trie structure maintained in the forwarding table—in order to determine the next hop or next router to which the packet is to be forwarded. For instance, in the example network 50 of FIG. 3, router A is shown as being coupled with four routers over various interfaces—router B over interface I1, routers D and E over interface 13, and router C over interfaces 12 and 14, in this example. The forwarding engine of router A accesses it forwarding table to determine to which next hop in the network to forward packets. The example network 50 of FIG. 3 will be used to illustrate various facets of embodiments of the invention. It is understood that the network 50 of FIG. 3 is by way of example for purposes of illustration, and that various embodiments of the present invention could be used in a wide variety of networks having various different routers.

Figures 3, 4:
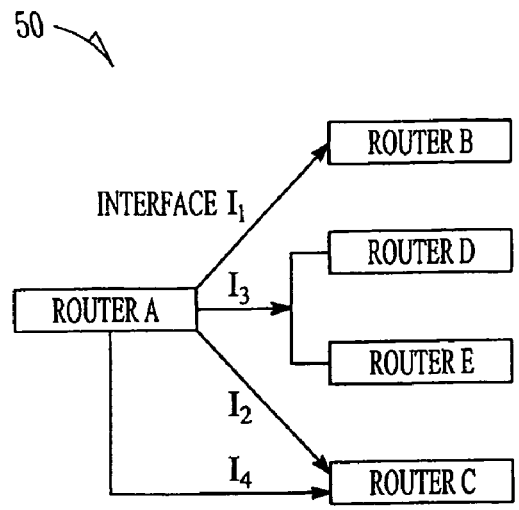
FIG. 3 illustrates a block diagram of a set of routers coupled with Router A over different interfaces.
FIG. 4 illustrates an example of a routing table with an example mapping of prefixes and next hop information, as used in accordance with one embodiment of the present invention.

FIG. 4 illustrates an example of a routing table 60 for the example router A of FIG. 3. In FIG. 4, the entries 62 of the routing table 60 include IP address information 64 mapped particular routers 66 over particular interfaces 68. Prefixes 70 may be used in a routing table 60 for a router to store route information specifying a range of IP destination addresses to be routed to a particular router over a particular interface. For instance, the prefix 1.1.0.0/16 maps to router B over interface I1, while prefix 4.4.4.4/32 maps to router E over interface 13, in this example. Accordingly, in one embodiment, a routing table 60 is provided for a router which includes a prefix 70 specifying a range of IP addresses that map to a particular router over an interface 68.

Figure 5:
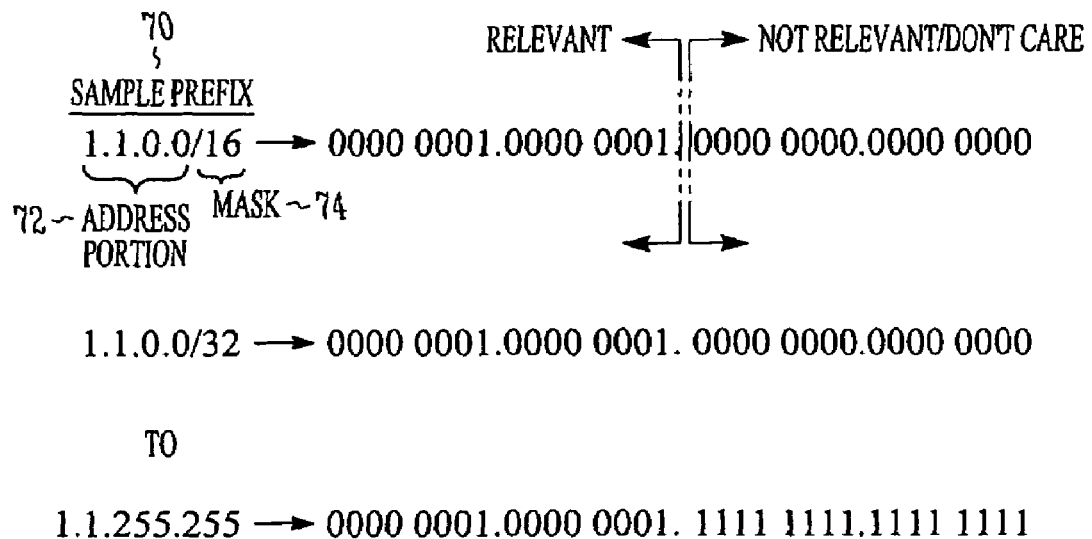
FIG. 5 illustrates an example of a prefix used to represent a range of IP addresses and next hop information, as used in accordance with one embodiment of the present invention.

As shown, the entries 62 of the routing table 60 contain IP address information 64, which may be represented using prefixes 70. A prefix 70 is a shorthand expression of an IP address or a range of IP addresses. An IP address is comprised of four eight bit values separated by periods. As shown in FIG. 5, a prefix 70 includes an address portion 72 and a mask portion 74. The address portion 72 specifies a 32 bit value, while the mask portion 74 specifies a number of bits that are relevant in interpreting the address portion 72 of the prefix 70. In one example, the mask portion 74 of a prefix 70 specifies the number of left most bits of the address portion which are relevant, with the remaining bits being irrelevant or "don't cares." For instance, as illustrated in the example prefix of FIG. 5, the prefix 1.1.0.0/16 represents IP addresses in the range of 1.1.0.0/32 through 1.1.255.255/32.

The examples of FIGS. 10-19 will be described with reference to situations where prefixes 70 are used to represent ranges of IP addresses mapped to next hop routers. It is understood that the principles disclosed herein would be useful in systems where prefixes 70 are used to represent IP addresses, or in systems where the entries in the routing table or forwarding tables use IP addresses or other representation, descriptors or other constructs of IP addresses.

Figure 6:
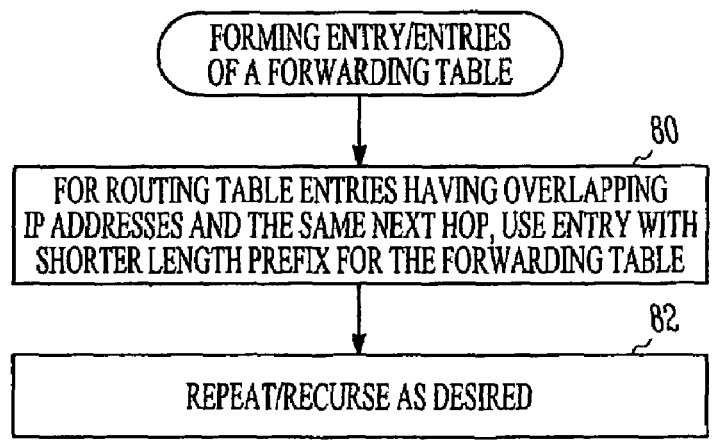
FIG. 6 illustrates an example operation for creating a forwarding table entry representing multiple routing table entries, in accordance with one embodiment of the present invention.
Figures 9, 10:
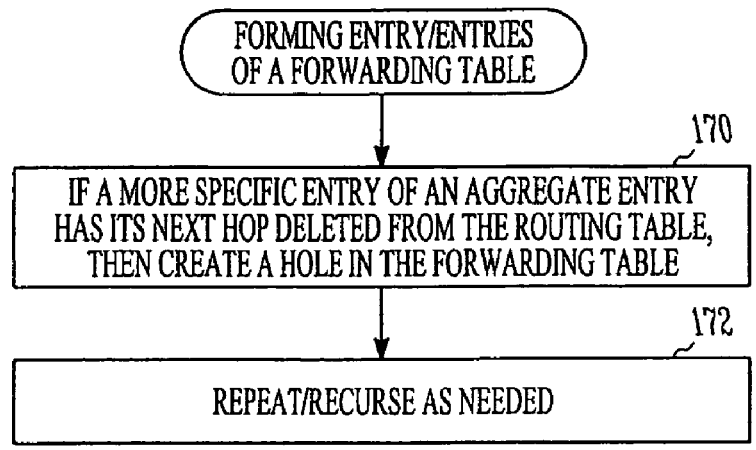
FIG. 9 illustrates an example operation for creating a forwarding table entry representing multiple routing table entries, in accordance with one embodiment of the present invention.
FIG. 10 illustrates an example of representing entries of a routing table with an entry for use in a forwarding table, in accordance with one embodiment of the present invention.

Referring now to FIG. 6, FIG. 6 illustrates an example of logical operations for forming one or more entries of a forwarding table, in accordance with one embodiment of the present invention. At operation 80, for routing table entries having overlapping IP addresses and having the same next hop, a forwarding table entry may be used to represent the routing table entries wherein the forwarding table entry uses a shorter length prefix. An example of such an operation is illustrated in FIG. 10, wherein an example of routing table entries includes an entry 84 of 14.0.0/16 mapping to router B over interface I1, and entry 86 of 1.1.1.0./24 mapping to router B over interface I1. In applying operation 80 of FIG. 6 to these routing table entries 84, 86, these routing table entries 84, 86 may be represented in the forwarding table as an entry 88 of 1.1.0.0/16 mapping to a next hop of router B over interface I1, in accordance with one example of the present invention. In this example, the entries 84, 86 of the routing table have the same next hop and the addresses specified by the entries 84, 86 overlap, and accordingly, an entry 88 for a forwarding table is formed using the less specific entry 84 from the routing table (i.e., the entry of the routing table having the shorter length prefix).

At operation 82 of FIG. 6, a repeat or recursion operation is provided such that operation 80 of FIG. 6 may be repeated or performed recursively as desired and applied throughout the routing table using various entries from the routing table to form one or more forwarding table entries corresponding thereto. Hence, by repeating operation 80 using various entries from the routing table, or by applying operation 80 recursively on the results generated by operation 80 in conjunction with other entries from the routing table, the overall number of the resulting entries for the forwarding table may be substantially less than the number of entries of the routing table.

Another example of the operations of FIG. 6 is illustrated in FIG. 11, wherein the routing table contains an entry 84 of 1.1.0.0/16 mapping to next hop router B over interface I1; an entry 86 of 1.1.1.0/24 mapping to next hop router B over interface I1; and an entry 90 of 1.1.1.1/32 mapping to next hop router D over interface 13. In this example, the top two routing table entries 84, 86 may be represented in the forwarding table using operation 80 of FIG. 6 to produce an entry 88 of 1.1.0.0/16 mapping to next hop router B over interface I1. The bottom entry 90 of the routing table can be represented identically in the forwarding table as entry 92. In this example, if the routing table entry 86 of 1.1.1.0/24 changes such that its next hop is router D over interface 13 (shown in FIG. 11 as entry 94), then an entry 96 may be added to the forwarding table corresponding to entry 94, and the entry 92 of 1.1.1.1/32 mapping to next hop router D over interface 13 may be deleted. This example also illustrates that changes in the routing table entries may result in additions or deletions of entries in the forwarding table.

Figure 7:
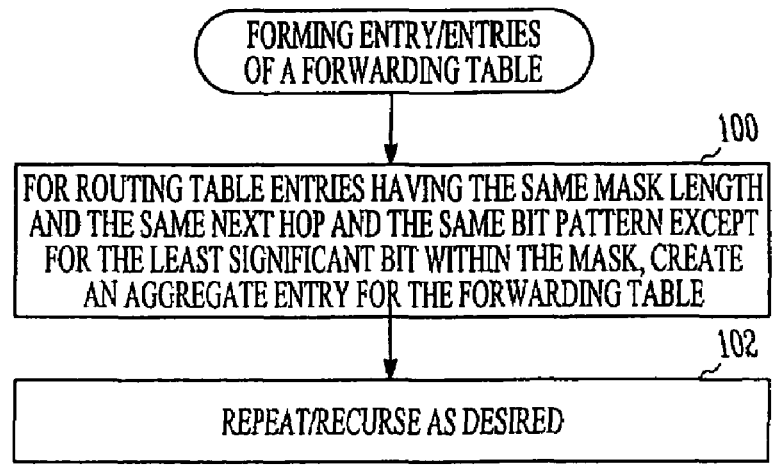
FIG. 7 illustrates an example operation for creating a forwarding table entry representing multiple routing table entries, in accordance with one embodiment of the present invention.

FIG. 7 illustrates logical operations for forming one or more entries of the forwarding table, in accordance with one embodiment of the present invention. At operation 100, an aggregate entry is created for use in a forwarding table. In one embodiment, the aggregate entry is created if two or more routing table entries have the same mask length and the same next hop, as well as the same bit pattern except for the least significant bit within the mask. In one example, when the aggregate entry is created, it has a mask length less than the mask length of the routing table entries which are being aggregated. In one example, the aggregate entry formed is used to populate the forwarding table even though the aggregate entry itself did not implicitly exist in the routing table (nor is the aggregate entry placed in the routing table, in one example).

At operation 102 of FIG. 7, a repeat or recursion operation is provided such that operation 100 of FIG. 7 may be repeated or performed recursively as desired and applied throughout the routing table using various entries from the routing table to form one or more forwarding table entries corresponding thereto. Hence, by repeating operation 100 using various entries from the routing table, or by applying operation 100 recursively on the results generated by operation 100 in conjunction with other entries from the routing table, the overall number of the resulting entries for the forwarding table may be substantially less than the number of entries of the routing table. In one embodiment, recursive application of operation 110 results in compression of prefixes that have different mask lengths, such as shown in FIG. 14 described below.

FIGS. 12-16 illustrate various examples of forming an aggregate entry adapted for use in a forwarding table, in accordance with an embodiment of the present invention. In the example of FIG. 12, the routing table entries 110, 112 for which an aggregate entry 114 may be formed both have a next hop router D over interface 13, and have a prefix of 2.2.0.0/24 and 2.2.1.0/24, in this example. As shown in FIG. 12, these routing table entries 110, 112 may be represented in a forwarding table as an aggregate entry 114 of 2.2.0.0/23 mapping to next hop router D over interface 13. This is because the aggregate entry 114 of 2.2.0.0/23 represents both of the routing table entries 110, 112 and accordingly, the aggregate forwarding table entry 114 represents the same amount of forwarding information as the corresponding routing table entries.

In the example of FIG. 13, again the routing table entries 110, 112 may be represented as an aggregate forwarding table entry 114, as described with reference to FIG. 12. In FIG. 13, however, if the routing table entry 112 of 2.2.1.0/24 changes its next hop router to router E over interface 13 (shown in FIG. 13 as entry 120), then the forwarding table entry 114 of 2.2.0.0/23 (mapping to next hop router D over interface 13) is deleted, and two entries 122 and 124 are passed to the forwarding table including entry 122 of 2.2.0.0/24 (mapping to next hop router D over interface 13, corresponding to entry 110) and entry 124 of 2.2.1.0/24 (mapping to next hop router E over interface 13, corresponding to entry 120). In this example, a change of a routing table entry 112 results in deletion of an aggregate entry 114 in the forwarding table because the change in the routing rendered the aggregate entry 114 of the forwarding table no longer valid in this example.

In the example of FIG. 14, the routing table entries 110, 112 shown may be represented using an aggregate entry 114 as previously shown in FIG. 12. In FIG. 14, however, if a routing table entry 130 is added of 2.2.2.0/23 mapping to next hop router D over interface 13, then it can be seen that a new aggregate for the forwarding table may be formed of 2.2.0.0/22 mapping to next hop router D over interface 13, and the prior aggregate 114 is deleted. In this example, the new aggregate 132 added to the forwarding table represents all three entries 110, 112, 130 of the routing table after the routing table is changed as described in this example.

In the example of FIG. 15, four routing table entries 140, 142, 144, 146 may be represented as an aggregate entry 148 in the forwarding table of 2.2.0.0/22 mapping to next hop router D over interface 13. In this example, it can be seen that a plurality or set of routing table entries may be represented using a single entry 148 in the forwarding table.

In the example of FIG. 16, the routing table entries 140, 142, 144, 146 shown are represented in the forwarding table using an aggregate entry 148, as previously shown in FIG. 15. In FIG. 16, however, if the entry 142 of 2.2.0/24 (mapping to next hop router D over interface 13) is deleted, then the aggregate entry 148 in the forwarding table is deleted, and an aggregate entry 150 of 2.2.0.0/23 mapping to next hop router D over interface 13 is added to the forwarding table. This aggregate entry 150 corresponds to the bottom two entries 144, 146 of the routing table in the example of FIG. 16. The forwarding table is also populated with the top entry 140 of the routing table, in this example, shown as entry 152. Accordingly, in FIG. 16 after the routing table changes, the remaining entries of the routing table are represented using two forwarding table entries 150, 152 shown in FIG. 16, in this example.

Figure 8:
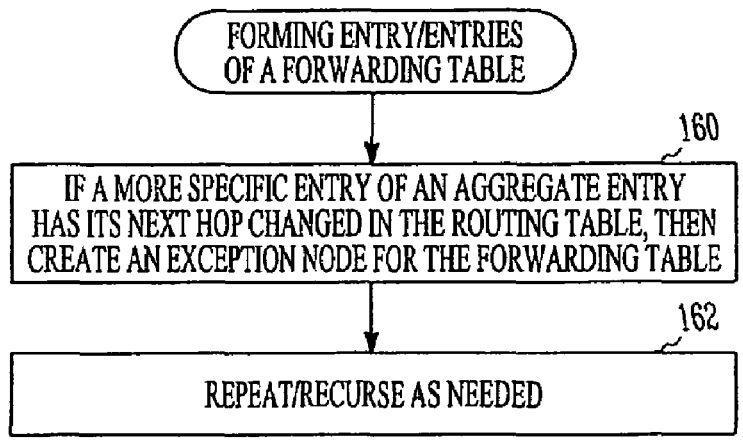
FIG. 8 illustrates an example operation for creating a forwarding table entry representing multiple routing table entries, in accordance with one embodiment of the present invention.

Referring now to FIGS. 8 and 9 and the examples of FIGS. 17-19 corresponding thereto, these figures relate to situations where a next hop of a routing table entry changes or is deleted, wherein the routing table entry has been represented in the forwarding table using an aggregate entry, in accordance with one embodiment of the present invention.

FIG. 8 illustrates an example of logical operations for forming entries of a forwarding table, in accordance with one embodiment of the present invention. At operation 160, if an entry of a routing table is represented in a forwarding table using an aggregate entry, and the entry of the routing table has its next hop/interface changed in the routing table, then an exception node may be created and used within the forwarding table. At operation 162 of FIG. 8, a repeat or recursion operation is provided such that operation 160 of FIG. 8 may be repeated or performed recursively as desired and applied throughout the routing table using various entries from the routing table to form one or more forwarding table entries corresponding thereto.

FIG. 17 illustrates an example of operation 160 of FIG. 8. In FIG. 17, there are four routing table entries 140, 142, 144, 146 which are represented in the forwarding table using an aggregate entry 148, as previously described with reference to FIG. 15. In FIG. 17, if one of the routing table entries 142 of 2.2.2.0/24 has its next hop router changed to router C over interface 14, then in order to handle this situation, the forwarding table may be populated with an exception node entry 164, such as 2.2.2.0/24 mapping to next hop router C over interface 14, as shown in FIG. 17. Because the exception node 164 has a longer mask in the prefix than the mask of the aggregate entry, it can be seen that a look-up operation which performs a longest prefix match would, if appropriate, forward using the exception node 164 if a longest prefix match dictated such a result. Accordingly, the exception node 164 operates as an exception to the aggregate entry 148 in the forwarding table, and both may coexist in the forwarding table and provide accurate forwarding information.

FIG. 9 illustrates an example of logical operations for forming entries of a forwarding table, in accordance with one embodiment of the present invention. At operation 170, if an entry of a routing table is represented in a forwarding table using an aggregate entry, and the entry of the routing table has its next hop/interface deleted from the routing table, then a "hole" or discard entry may be created and used within the forwarding table. The hole or discard entry provides that data received which corresponds to the IP addresses specified by the prefix of the hole or discard entry is discarded. At operation 172 of FIG. 9, a repeat or recursion operation is provided such that operation 170 of FIG. 9 may be repeated or performed recursively as desired and applied throughout the routing table using various entries from the routing table to form one or more forwarding table entries corresponding thereto.

FIG. 18 illustrates an example wherein a set of routing table entries 140, 142, 144, 146 is represented using an aggregate entry 148 in the forwarding table, and wherein an exception node 164 is also utilized as described with reference to FIG. 17. In FIG. 18, however, if the routing table entry for the prefix 2.2.2.0/24 via router C over interface 14 (shown as entry 143) is deleted entirely from the routing table, then, in one embodiment, an entry 174 representing a hole in the forwarding table may be created in the forwarding table. In this example, the forwarding table entry 174 of 2.2.2.0/24 maps to a "discard" function wherein any data received which corresponds to the IP addresses specified by the prefix of 2.2.2.0/24 is discarded, in one example because the router C over interface 14 has been deleted from the routing table. In this manner, the aggregate entry 148 in the forwarding table and the hole 174 created in the forwarding table provide for accurate forwarding information.

In the example of FIG. 19, assuming that the routing table and forwarding table are as shown in FIG. 19 (which corresponds to the results of the example of FIG. 18), if in FIG. 19 an entry 180 is added to the routing table of 2.2.0.0/22 mapping to next hop router C over interface 12, then in this case it can be seen that the new entry 180 to the routing table has the same prefix as the aggregate entry 148 in forwarding table, however, specifies a different next hop router/interface. In this example, the aggregate entry 148 in the forwarding table may be maintained, and the "hole" entry 174 of the forwarding table may be revised to form an entry 182 that maps to the next hop router C over interface 12, in this example. Again, because the forwarding table is used to perform a longest prefix match operation, the aggregate entry 148 in the forwarding table will be used for all IP addresses falling within the range specified by the prefix of the aggregate entry 148, except in the instance where the IP address falls within the range specified by the entry 182 of 2.2.2.0/24 (having a longer mask length than the aggregate entry).

The operations of FIGS. 6, 7, 8 and 9 may be performed individually or in any combination or in any order with each other, if desired, in order to reduce the number of entries of a forwarding table. It has been found that by performing the operations described above to reduce the number of entries of a forwarding table, the forwarding table is populated with fewer entries, which may result in a forwarding table having 50 to 80 percent fewer entries than the corresponding routing table, in one example.

Various embodiments of the present invention, including one or more of the operations described herein, may be embodied as computer program products (such as disks or CD-ROMS or other computer program products) including computer usable medium and computer readable code embodied on the computer usable medium, the computer readable code including computer readable program code devices configured to cause the computer to perform or effect one or more of the operations described herein. Further, one or more of the operations described herein may be embodied as one or more modules configured to operate within a device or apparatus such as a router or computer. One example of a router is described in co-pending application Ser. No. 10/177, 496 entitled "Packet Routing and Switching Device" filed Jun. 20, 2002, the disclosure of which is incorporated herein by reference in its entirety.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the invention has been particularly shown and described with reference to various embodiments thereof, it will be understood by those skilled in the art that various other changes in the form and details may be made without departing from the spirit and scope of the invention.

We claim:

1. In a router, a method for representing in a forwarding table two or more entries of a routing table, the method comprising:
    comparing a destination address of a packet to entries in the forwarding table to determine a next router to which the packet is to be forwarded, said entries in the forwarding table organized as nodes of a trie;
    determining if the two or more entries of the routing table can be represented in the forwarding table using a reduced number of entries, said two or more entries of the routing table organized as nodes of the trie; and
    if so, representing in the forwarding table the two or more entries of the routing table using the reduced number of entries.

2. The method of claim 1, wherein the determining further comprises:
    identifying a set of entries of the routing table which specify overlapping IP addresses and the same next hop router.

3. The method of claim 1, wherein the determining further comprises:
    identifying a set of entries of the routing table which specify the same next hop router and for which an aggregate entry may represent the set of entries.

4. The method of claim 3, wherein the representing further comprises:
    representing the set of entries of the routing table with the aggregate entry for the forwarding table.

5. The method of claim 4, wherein if one entry of the set of entries undergoes a change in its next hop router, creating an exception node entry in the forwarding table to represent the one entry.

6. The method of claim 4, wherein if one entry of the set of entries has its next hop router deleted, creating a discard entry in the forwarding table to represent the one entry.

7. In a router having a routing table and a forwarding table, a method comprising:
    determining a next router to which a packet is to be forwarded, the determination based, in part, upon the forwarding table organized as a trie; and
    creating an entry for use in the forwarding table, said entry corresponding to multiple entries of the routing table, said multiple entries organized as part of the trie.

8. The method of claim 7, further comprising:
    storing the entry in the forwarding table.

9. The method of claim 7, wherein the entry corresponds to a set of entries of the routing table which specify overlapping IP addresses and a same next hop router.

10. The method of claim 7, wherein the entry is an aggregate entry corresponding to a set of entries of the routing table which specify the same next hop router.

11. A router including a routing table and a forwarding table, comprising:
    a module configured to determine destination entries in a routing table, said destination entries organized as nodes of a trie; and
    a module for creating an entry for use in the forwarding table, said entry corresponding to multiple entries of the routing table, and organized as a node of the trie.

12. A router including a routing table and a forwarding table, comprising:

a module for determining if the two or more entries of the routing table can be represented in the forwarding table using a reduced number of entries, said two or more entries organized as nodes of a trie; and a module for representing in the forwarding table the two or more entries of the routing table using the reduced number of entries said reduced number of entries organized as nodes of a trie.

13. A computer readable medium to represent two or more entries of a routing table of a router using a reduced number of entries in a forwarding table, the computer readable medium containing instructions which, when executed by a processor, cause the processor to perform operations comprising:

comparing a destination address of a packet to entries in the forwarding table to determine a next router to which the packet is to be forwarded, said entries in the forwarding table organized as nodes of a trie;

determining if the two or more entries of the routing table can be represented in the forwarding table using a reduced number of entries, said two or more entries of the routing table organized as nodes of the trie; and representing in the forwarding table the two or more entries of the routing table using the reduced number of entries.

14. The computer readable medium of claim 13 that cause the processor to perform operations comprising:

recursively traversing a routing table selecting Internet Protocol (IP) addresses, the routing table based, in part, on the trie contained in the forwarding table;

determining whether IP address overlap exists relating to a first entry and a second entry for the same next hop; and selecting the first entry or the second entry, where the first or second entry has a shorter length prefix.

* * * * *

UNITED STATES PATENT AND TRADEMARK OFFICE
CERTIFICATE OF CORRECTION

| | | |
|---|---|---|
| PATENT NO. | : 7,453,883 B1 | Page 1 of 1 |
| APPLICATION NO. | : 10/414137 | |
| DATED | : November 18, 2008 | |
| INVENTOR(S) | : Lynch et al. | |

It is certified that error appears in the above-identified patent and that said Letters Patent is hereby corrected as shown below:

In column 1, line 31, delete "route/processor" and insert -- route processor --, therefor.

In column 6, line 8, delete "14.0.0/16" and insert -- 1.1.0.0/16 --, therefor.

Signed and Sealed this

Second Day of March, 2010

David J. Kappos
*Director of the United States Patent and Trademark Office*